June 2, 1936.   R. H. TULL ET AL   2,042,812
REFRIGERATION APPARATUS
Filed Feb. 23, 1934   2 Sheets-Sheet 1

WITNESSES:

INVENTORS
R. H. TULL, AND
B. J. HOMKES.
BY
ATTORNEY

June 2, 1936.  R. H. TULL ET AL  2,042,812
REFRIGERATION APPARATUS
Filed Feb. 23, 1934  2 Sheets-Sheet 2

WITNESSES:

INVENTORS
R. H. TULL, AND
B. J. HOMKES.
BY
ATTORNEY

Patented June 2, 1936

2,042,812

UNITED STATES PATENT OFFICE 2,042,812

REFRIGERATION APPARATUS

Robert H. Tull and Bartell J. Homkes, Springfield, Mass., assignors to Westinghouse Electric & Manufacturing Company, East Pittsburgh, Pa., a corporation of Pennsylvania Application February 23, 1934, Serial No. 712,509

10 Claims. (Cl. 62—4)

This invention relates to heating systems and particularly to apparatus for utilizing the heat of a refrigerating system for heating a fluid such as, for example, water.

It is an object of the invention to provide a highly efficient and compact fluid heating system.

It is another object of the invention to utilize the heat dissipated by a refrigerating system for heating a fluid.

It is a further object of the invention to provide protection for the electrical and mechanical parts of such a heating system.

It is still another object of the invention to utilize large portions of the heat dissipated from a refrigerating system for heating a fluid.

It is a further object of the invention to provide a novel refrigerating system for heating a fluid.

It is yet a further object of the invention to provide a novel circuit for the fluid which is to be heated by the refrigerating system.

These and other objects are effected by our invention, as will be apparent from the following description and claims taken in connection with the accompanying drawings, forming a part of this application, in which:

Figure 1:
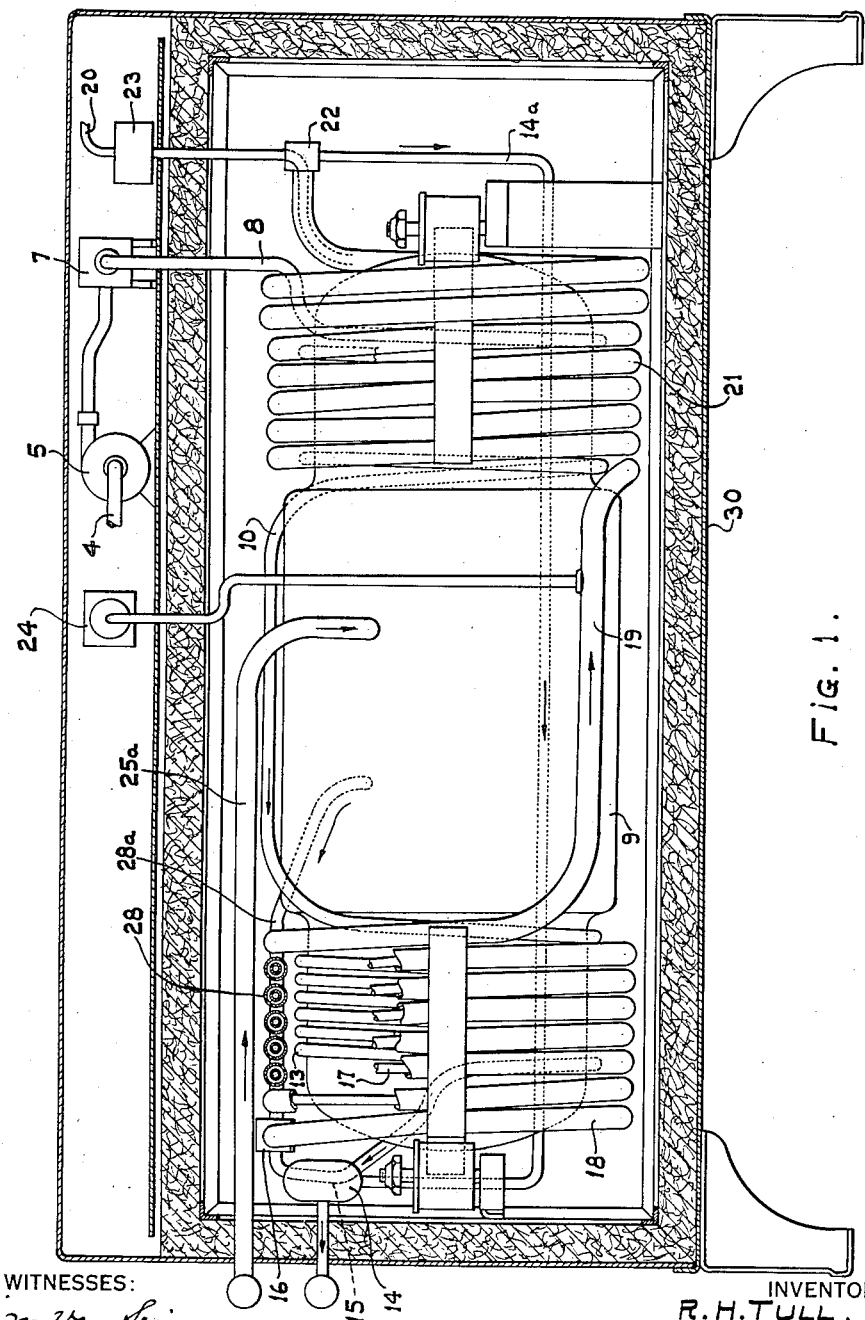
Fig. 1 is a view, partly in section, of a compression unit utilized in practicing the invention.

It is well known that the efficiency, i. e., the relation of power input expressed in B. t. u.'s to the heat output in B. t. u.'s, in a refrigerating system for heating fluids and the like, is above 100%. The reason for this efficiency is that the heat which is translated from electrical energy due to operation of the motor and friction losses is available, and the heat absorbed by the refrigerant in the cooling unit when it evaporates is also available for use in heating.

Referring specifically to the drawings for a detailed description of the invention, numeral 1 designates a storage tank for a fluid, such as, for example, water. The storage tank is provided with the usual inlet and outlet conduits 2 and 3 respectively for maintaining the storage tank full and for removing hot water for use.

Another outlet conduit 4 extends from the tank to a pump 5, which is preferably driven by an electric motor 6. The pump discharges water to a water regulating inlet valve 7. The valve 7 is set to allow water to flow at a predetermined rate in response to the pressure of the water at the valve.

From the valve 7, water is discharged to a conduit 8 which is coiled around one end of a casing 9 in good thermal relation therewith. (See Fig. 1.) The casing 9 encloses and seals a refrigerating compression means 11 and electric motor driving means 12. Water leaves the coiled conduit 8 and is discharged through a conduit 10 to another coiled conduit 13 around the other end of the casing 9. It is to be noted that the motor driving means 12 are disposed in the ends of the casing 9.

Water is discharged from the coiled conduit 13 through a refrigerant receiver 14 through a conduit 15 which extends through the receiver 14 and connects with a suitable fitting 16. Water then enters an interior conduit 17 of a concentric conduit 18 coiled about one end of the casing 9, (see Fig. 1) and is then discharged through a connecting concentric conduit 19 to a second concentric conduit 21 coiled about the other end of the casing 9.

Water leaves the concentric conduit 21 through a suitable fitting 22 and a water outlet connection 23 and is discharged to the top of the storage tank 1 through a conduit 20, thus completing the water circulating system. A high-pressure cut-out switch 24 is connected into the water line between the water regulating inlet valve 7 and the first coiled conduit 8.

The compressor 11 draws spent refrigerant, containing the heat necessary to vaporize it, from a heat absorbing, or evaporative cooling element 25, through a conduit 25a. The heat absorbing element 25 is provided with a blower or fan 26 driven by an electric motor 27, to insure a supply of warm air to the heat absorbing element. The refrigerant is compressed by the compression means 11 and is discharged through a conduit 28a to the outer conduit 28 of concentric conduits 18, 19, and 21, and after refrigerant condenses therein, because of the cooling effect of the water in the inner concentric conduit 17, the refrigerant is discharged through a conduit 14a to the liquid receiver 14. From the liquid receiver, refrigerant is supplied to the heat-absorbing element 25 after passing through a suitable expansion device 29. As the refrigerant is vaporized, it absorbs heat from the air passing over the heat-absorbing element 25, and is returned to the compression means 11, whereupon the refrigerant cycle is completed.

Figure 2:
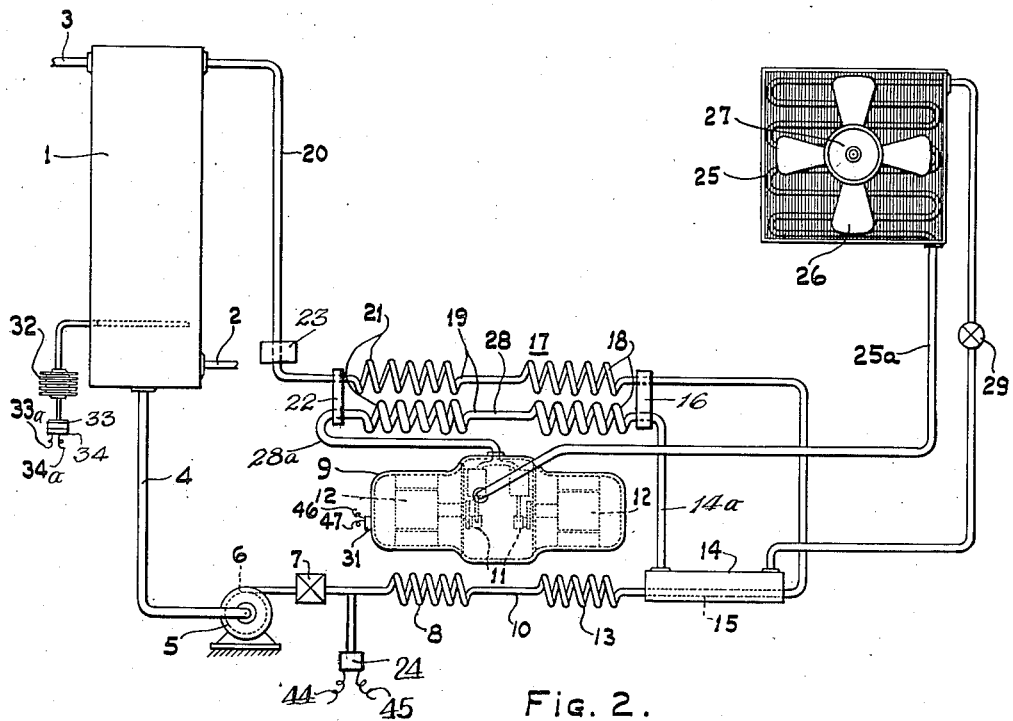
Fig. 2 is a diagrammatic view of a heating system arranged in accordance with the invention, and particularly adapted to heat water for household use; and, Fig. 3 is a wiring diagram illustrating the electrical connections of the heating system.
Figure 3:
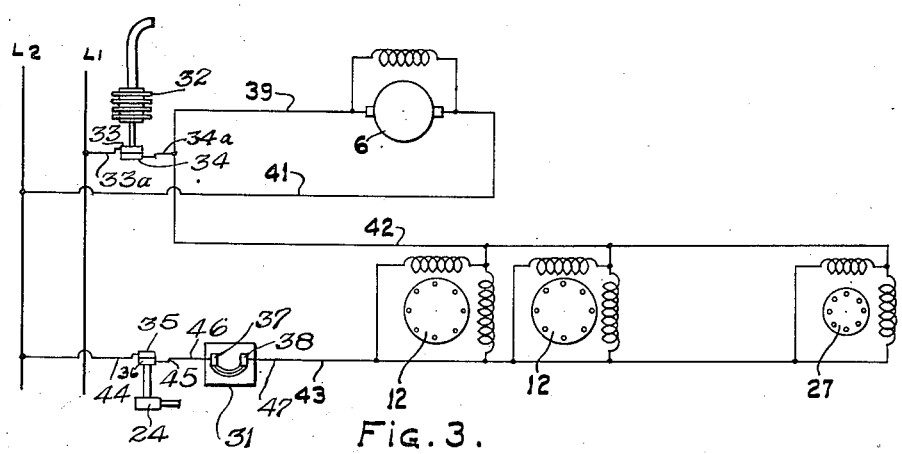

A thermal responsive overload device, shown diagrammatically at 31 in Fig. 2, is preferably fastened to a motor end of the casing 9.

A heat insulating casing 30 surrounds the compression means 11, motor 12, casing 9, receiver 14 and condenser 18, 19, and 21, to insure transfer of the maximum amount of heat from the above parts to the water.

In operation, when the temperature of the water in the storage tank 1 drops to a predetermined temperature, a thermostat 32, which preferably surrounds the tank 1, operates to close main contacts 33 and 34. The contact 33 is connected to one side of a line L₁ through conductor 33a. Since contacts 35 and 36 which are associated with the high pressure cut-out switch 24, and contacts 37 and 38, which are associated with the thermal overload device 31, are closed, current flows through conductors 33a, 34a, 39, pump motor 6 and conductor 41 to the other side of the line L₂, thus energizing the pump motor. At the same time, current flows from line L₁ through conductor 33a, main contacts 33 and 34, conductor 34a, through conductors 42, 43, 47 and contacts 38, 37, conductors 46, 45, contacts 36, 35, and conductor 44 to the other side of the line L₂, thus energizing the compression means driving motors 12, and the fan motor 27, which motors 12 and 27 are connected in parallel across conductors 42, 43.

When motors 6, 12, and 27 are energized, refrigerant is pumped to condensing means 18, 19, and 21 and heat from operation of the motors 12 and the heat given up by the condensation of the refrigerant is transferred to the water, which is being circulated through conduit 8 in heat conducting relation with the casing 9, the liquid receiver 14, and with the condensing means 18, 19, and 21 by the pump 5. The temperature of the water leaving the conduit 8 is lower than the temperature of refrigerant in the receiver 14 so that the water absorbs heat therefrom. The water leaving the receiver 14 is lower in temperature than the refrigerant in the condensing means and the water also absorbs heat therefrom. A large amount of the available heat is, therefore, absorbed by the water before returning it to the tank 1. Heat is, therefore, supplied to the water from the refrigerant which the compression means 11 withdraws from the heat-absorbing element 25 and compresses, from the translation of electrical energy to heat and from friction losses in the refrigerating system.

The inlet water regulating valve 7 is arranged so that only sufficient water passes through the water circulating system to insure a predetermined temperature of water entering the storage tank 1, within relatively narrow limits. This adjustment may be readily made since the amount of heat which is available for transfer to the circulating water is determined within relatively narrow limits.

If the temperature of the water or the refrigerant pressure in the system becomes too high because of some abnormal condition, the high pressure cut-out switch 24 operates through conductors 44 and 45, shown diagrammatically in Fig. 2, to open contacts 35 and 36. In the same manner, if the temperature of the casing 9 rises due to motor overload, et cetera, the thermal overload device 31 operates through conductors 46 and 47, shown diagrammatically in Fig. 2, to open contacts 37 and 38. If either contacts 35 and 36, or 37 and 38 are opened, the motors 12 driving the compression means 11, and the motor 27 driving the fan 26 are deenergized. The motor 6 driving the pump 5, however, remains energized and circulates cooling water for the refrigerating apparatus. As soon as the apparatus is thus cooled, normal operation is resumed if the thermostat 32 still maintains the contacts 33 and 34 closed. When the demand for heated water has been satisfied, the main contacts 33 and 34 are opened by the thermostat 32, and all the motors deenergized. From the foregoing, it is apparent that the invention provides a novel and compact heating system for fluids and control therefor, in conjunction with refrigerating apparatus as the source of heat, and that a large amount of the heat available from operation of the refrigerating apparatus is transferred to the fluid to be heated.

While the invention is shown in but one form, it will be obvious to those skilled in the art that it is not so limited, but is susceptible of various changes and modifications, without departing from the spirit thereof, and it is desired, therefore, that only such limitations shall be placed thereupon as are imposed by the prior art or as are specifically set forth in the appended claims.

What we claim is:

1. In a heating system for fluids, the combination of a storage tank from which heated fluid is drawn for use, a refrigerating apparatus including a compression means, a casing for the compression means, driving means for the compression means, condensing means and cooling means, and means for operating the refrigerating apparatus and for circulating the fluid from the storage tank in heat exchange relation with the casing of the compression means and with the condensing means for heating the fluid.

2. In a heating system for fluids, the combination of a storage tank from which heated fluid is drawn for use, a refrigerating apparatus including a compression means, a casing for the compression means, driving means for the compression means, condensing means and cooling means, and means for operating the refrigerating apparatus and for circulating the fluid from the storage tank in heat exchange relation first with the casing of the compression means, and then with the condensing means for heating the fluid.

3. In a heating system for fluids, the combination of a storage tank from which heated fluid is drawn for use, a refrigerating apparatus including a compression means, driving means for the compression means, a casing for enclosing the compression means and the driving means and from which heat is dissipated, condensing means and evaporative heat absorbing means, and means for operating the refrigerating apparatus and for circulating the fluid from the storage tank in heat exchange relation first with the casing enclosing the compression means and driving means, and then with the condensing means for heating the fluid.

4. In a heating system for fluids, the combination of a storage tank from which heated water is drawn for use, a refrigerating apparatus including a compression means, driving means for the compression means, a casing for enclosing the compression means and the driving means and from which heat is dissipated, condensing means comprising concentric tubes for conveying refrigerant and cooling fluid, and an evaporative heat absorbing means, and means for operating the refrigerating apparatus and circulating the fluid from the storage tank in heat exchange relation first with the casing enclosing the compression and driving means, and then through one of the concentric tubes of the condensing means for heating the fluid.

5. In a heating system for fluids, the combination of a storage tank from which heated water is drawn for use, a refrigerating apparatus including a compression means, driving means for the compression means, a casing for enclosing the compression means and the driving means and from which heat is dissipated, condensing means comprising concentric tubes for conveying refrigerant and cooling fluid, and an evaporative heat absorbing means, and means for operating the refrigerating apparatus and for circulating the fluid from the storage tank in heat exchange relation first with the casing enclosing the compression and driving means, and then through one of the concentric tubes of the condensing means for heating the fluid, said casing enclosing the driving means and compression means and said condensing means being contained in a heat insulated casing.

6. In a heating system for fluids, the combination of a storage tank from which heated fluid is drawn for use, a refrigerating apparatus including a compression means, a casing for the compression means, driving means for the compression means, condensing means, and cooling means, means operable to circulate the fluid from the storage tank in heat exchange relation with the casing of the compression means and with the condensing means, and means for affecting operation of the refrigerating apparatus and fluid circulating means in response to the temperature of the fluid to heat the same.

7. In a heating system for fluids, the combination of a refrigerating apparatus including a compression means, a driving means for the compression means, a casing for enclosing the compression means and driving means and from which heat is dissipated, condensing means comprising concentric tubing for conveying refrigerant and cooling fluid, and a heat absorbing means, and means for operating the refrigerating apparatus and for circulating fluid in heat exchanging relation first with those portions of the casing which enclose the driving means and then through one of the concentric tubes of the condensing means, whereby the fluid is heated, the refrigerating apparatus is cooled and compressed refrigerant is condensed.

8. In a heating system for fluids, the combination of a refrigerating apparatus including compression means, electrical driving means for the compression means, thermo-responsive overload means associated with the driving means, condensing means, a high pressure cut-out switch associated with the condensing means, and heat absorbing means, and a fluid circulating system including a pump, a second electrical driving means for the pump, conduit for passing the fluid in heat exchange relation with the compression means, the driving means and the condensing means, and means affected by the temperature of the fluid for energizing the first and second electrical driving means, said overload means and cut-out switch being operable to deenergize only the first electrical driving means in response to an abnormal condition of the heating system.

9. In a heating system for fluids, the combination of a refrigerating system including compression means, electrical driving means for the compression means including thermo-responsive overload means associated therewith, condensing means, a high pressure cut-out switch associated with the condensing means, and heat absorbing means comprising a chamber containing refrigerant to be vaporized, a blower, and second electrical driving means for the blower, and a fluid circulating system including a pump, third electrical driving means for the pump, and conduit means for passing the fluid in heat exchange relation with the compression means, the first electrical driving means and the condensing means, and means affected by the temperature of the fluid for energizing all the electrical driving means, said overload means and cut-out switch adapted to deenergize only the first and third electrical driving means when either the cut-out switch or overload means are operated because of an abnormal condition of the heating system.

10. In a heating system for fluids, the combination of a refrigerating system including a compressing means, electric motor driving means for the compression means, a condenser and a heat absorbing unit including a chamber for containing refrigerant to be vaporized, a fan for blowing air over the heat absorbing unit, and second electric motor driving means for the fan, and a fluid circulating system including a pump, third electric motor driving means for the pump, a fluid regulating inlet valve responsive to fluid pressure, a conduit connecting the pump and regulating valve, and conduit means for conveying fluid from the regulating valve in heat exchange relation with the compression means, the first electric driving means and the condensing means, and means affected by the temperature of the fluid for energizing all of said electric motor driving means.

ROBERT H. TULL.
BARTELL J. HOMKES.